US012781052B2

(12) United States Patent
Park et al.

(10) Patent No.: US 12,781,052 B2
(45) Date of Patent: Nov. 3, 2026

(54) COLORANT FOR HEAT TRANSFER FLUID, AND COMPOSITION COMPRISING SAME

(71) Applicant: KD Finechem Co., Ltd., Busan (KR)

(72) Inventors: Jae Yoon Park, Seoul (KR); Hyun Jin Park, Gyeonggi-do (KR); Hong Ki Lee, Busan (KR); Ja Won Kim, Busan (KR)

(73) Assignee: KD Finechem Co., Ltd., Busan (KR)

(*) Notice: Subject to any disclaimer, the term of this patent is extended or adjusted under 35 U.S.C. 154(b) by 956 days.

(21) Appl. No.: 17/783,140

(22) PCT Filed: Oct. 20, 2020

(86) PCT No.: PCT/KR2020/014358
§ 371 (c)(1),
(2) Date: Jun. 7, 2022

(87) PCT Pub. No.: WO2021/118042
PCT Pub. Date: Jun. 17, 2021

(65) Prior Publication Data

US 2023/0053517 A1 Feb. 23, 2023

(30) Foreign Application Priority Data

Dec. 10, 2019 (KR) ........................ 10-2019-0163927

(51) Int. Cl.

| | |
|---|---|
| ***C09B 47/08*** | (2006.01) |
| ***C09B 69/10*** | (2006.01) |
| ***C09K 5/10*** | (2006.01) |
| ***C23F 11/14*** | (2006.01) |
| *C09B 47/06* | (2006.01) |

(52) U.S. Cl.
CPC .............. *C09B 47/08* (2013.01); *C09B 69/10* (2013.01); *C09K 5/10* (2013.01); *C23F 11/149* (2013.01); *C09B 47/06* (2013.01); *C09B 47/061* (2013.01); *C09K 2205/102* (2013.01); *C09K 2205/132* (2013.01); *Y02E 60/50* (2013.01)

(58) Field of Classification Search
CPC ....... C09B 47/08; C09B 47/06; C09B 47/061; C09B 69/10; C09B 47/04; C09B 47/085; C09K 5/10; C09K 2205/102; C09K 2205/132; C23F 11/149; C23F 11/14; Y02E 60/50; C04B 47/062; C04B 47/064; C04B 47/0676
See application file for complete search history.

(56) References Cited

U.S. PATENT DOCUMENTS 5,792,860 A * 8/1998 McKeown ......... C09K 19/3488 540/122
2005/0245411 A1 11/2005 Yang et al.
2006/0051639 A1* 3/2006 Yang ........................ C09K 5/10 252/73

FOREIGN PATENT DOCUMENTS

| | | | |
|---|---|---|---|
| KR | 10-2004-0081040 | A | 9/2004 |
| KR | 10-2007-0050468 | A | 5/2007 |
| KR | 10-2013-0039949 | A | 4/2013 |
| WO | WO-02/101848 | A2 | 12/2002 |

OTHER PUBLICATIONS

International Search Report from corresponding PCT Application No. PCT/KR2020/014358, dated Feb. 9, 2021.

* cited by examiner

*Primary Examiner* — Marites A Guino-O Uzzle
(74) *Attorney, Agent, or Firm* — Harness, Dickey & Pierce, P.L.C.

(57) ABSTRACT

The present invention relates to a colorant for a heat transfer fluid, and a composition comprising same.

8 Claims, 5 Drawing Sheets

COLORANT FOR HEAT TRANSFER FLUID, AND COMPOSITION COMPRISING SAME

CROSS-REFERENCE TO RELATED APPLICATIONS

This application is a national phase application of PCT Application No. PCT/KR2020/014358, filed on Oct. 20, 2020, which claims priority to Korean Patent Application No. 10-2019-0163927, filed on Dec. 10, 2019. The entire disclosure of the applications identified in this paragraph is incorporated herein by reference.

TECHNICAL FIELD

The present disclosure relates to a colorant for a heat transfer fluid and a composition containing the same.

BACKGROUND ART

A fuel cell is a cell that produces electricity by using an electrochemical reaction of reducing hydride ions generated from an oxidation reaction at an anode into water at a cathode. The fuel cell is mainly composed of a cell stack in which cells are connected in series to obtain high output, and slight electric resistance is present inside cells. Such resistance converts some energy into heat energy not but electric energy to thereby generate a lot of heat.

Therefore, it is necessary to control the heat of an exothermic reaction, generated during an electrochemical reaction, in order for the fuel cell to achieve a desired current density level without the decomposition of components of the fuel cell, and thus an effective cooling system is absolutely needed for the operation of the fuel cell.

Deionized water (DI-Water), which has been widely used as a coolant for an initial cell system, has high electric resistance and excellent electric insulation and cooling performance, but has a disadvantage of being frozen at 0° C. or lower and a problem in that the coolant is easily contaminated by ion materials in the fuel cell system, resulting in a rapid drop in electric insulation.

For anti-freezing, calcium chloride, magnesium chloride, ethylene glycol, or the like is mixed with deionized water to increase the boiling point of water and lower the freezing point thereof. Such a mixture solution is also called a cooling liquid. A cooling liquid generally contains a colorant, so that the concentration of the cooling liquid can be easily checked with the naked eye and the cooling liquid can be prevented from being confused with water in an industrial field.

Acidic dyes, direct dyes, and the like are mainly used in fuel cell cooling liquids, but such acidic dyes and direct dyes do not have high chromogenic properties and somewhat low electrochemical stability.

Meanwhile, a fuel cell stack with several fuel cells connected is very high in operating voltage. Thus, a cooling liquid has very low conductivity and thus prevents and minimizes a risk of electric shock and minimizes the reduction of current shunt and the reduction of system efficiency.

However, dyes and colorants used in conventional fuel cell cooling liquids are generally highly conductive ion species and thus are not appropriate for use in a fuel cell cooling liquid requiring low conductivity.

Accordingly, there is a need for further research and development of a novel cooling liquid having electrochemical stability and low electrical conductivity.

SUMMARY

Technical Problem

An aspect of the present disclosure is to provide a colorant for a heat transfer fluid, the colorant having physical and chemical stability and showing excellent color intensity.

Another aspect of the present disclosure is to provide a cooling liquid composition containing the colorant.

Solution to Problem

The present disclosure relates to a colorant for a heat transfer fluid and a composition containing the same.

Hereinafter, the present disclosure will be described in more detail.

In an accordance with an aspect of the present disclosure, there is provided a colorant for a heat transfer fluid, the colorant having a structure of Chemical Formula 1 below.

$R—[X-A-Z]_y$ [Chemical Formula 1]

In the present disclosure, R may be a chromophore. Such a chromophore functions to display color by containing an unsaturated bond to allow pi(đ) electrons to absorb energy and thus be excited, and a peripheral substituent may bind to the chromophore to function as an auxochrome that changes the color tone of an organic compound.

In the present disclosure, the chromophore has at least one 5-member heterocyclic aromatic structure and binds to a benzene ring, and examples thereof may include porphyrin related tetrapyrrole compounds, phthalocyanine related tetrapyrrole compounds, or porpyrazine related tetrapyrrole compounds, but are not limited thereto.

In the present disclosure, X is a linker that links the chromophore and a water-soluble group and may be selected from the group consisting of C, O, N, and S. For example, the linker may be $—CH_2—$ having two hydrogen atoms when C is selected, —NH— having one hydrogen atom when N is selected, or —O— having no hydrogen atom when O is selected, but is not limited thereto.

In the present disclosure, A is a water-soluble group for giving water solubility to a colorant, and for example, the water-soluble group may be a $C_1$ to $C_4$ alkoxy group, but is not limited thereto.

In the present disclosure, Z may be an alkyl group containing —H or a $C_1$ to $C_4$ as an end substituent, but is not limited thereto.

In the present disclosure, y may be an integer of 4 to 16, for example, 4 or 8, but is not limited thereto.

In the present disclosure, [X-A-Z] may be a hydrophilic polymer, and examples thereof may include any one of polyethylene glycol (PEG), polyvinyl alcohol, polyvinylpyrrolidone, or two or more copolymers thereof, but is not limited thereto.

In the present disclosure, the polyethylene glycol may be at least one selected from the group consisting of mono ethylene glycol (MEG), di ethylene glycol (DEG), and tri ethylene glycol (TEG), but is not limited thereto.

In the present disclosure, the colorant may display a color of blue or bluish green, and the color change may appear depending on the type of peripheral substituents and the number of substituents.

In the present disclosure, the colorant for a heat transfer fluid may have a structure of Chemical Formula 2 or 3.

[Chemical Formula 2]

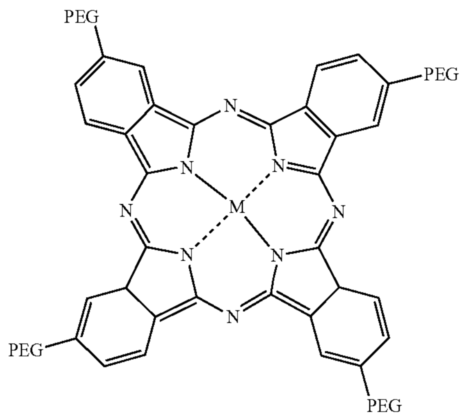

[Chemical Formula 3]

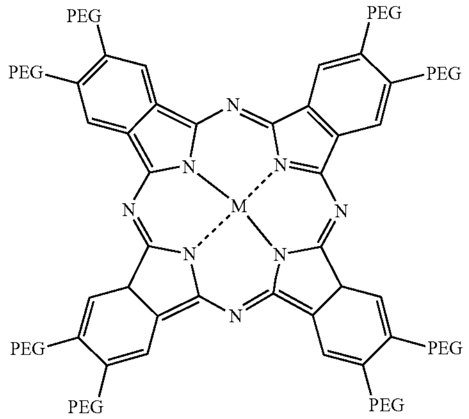

In the present disclosure, M may be a metal or a metalloid.

In the present disclosure, the metal or metalloid may be copper (Cu), zinc (Zn), silicon (Si), aluminum (Al), gallium (Ga), indium (In), titanium (Ti), tin (Sn), or ruthenium (Ru), for example, copper or zinc, but is not limited thereto.

Silicon is a metalloid element and is generally a non-metal, but silicon in the present disclosure refers to metallic silicon that has the same crystal structure as a metal crystal and exhibits properties close to those of a metal.

The colorant of the present disclosure has been described with reference to specific examples as above, but is not limited thereto. The colorants of the present disclosure having various structures and physical properties can be synthesized by first synthesizing a phthalonitrile derivative as a starting material and adjusting a component ratio thereof.

The colorant of the present disclosure is thermally stable in a temperature range of 250° C. or lower, leading to a weight loss rate of 10% or less.

In the present disclosure, the colorant may have a solubility of 1.0 g/L or more, 1.1 g/L or more, 1.2 g/L or more, 1.3 g/L or more, or 1.4 g/L or more, for example, 1.5 g/L or more, with respect to a cooling liquid composition. The colorant can sufficiently exhibit chromogenic properties at a solubility in the above ranges.

In the present disclosure, the cooling liquid composition may be a glycol-based cooling liquid composition, for example, an ethylene glycol-based cooling liquid composition, but is not limited thereto.

The colorant of the present disclosure may be well mixed in a cooling liquid composition due to excellent solubility properties with respect to the cooling liquid composition. In addition, the colorant has excellent physical and chemical stability and, especially, excellent chromogenic properties, and thus can exhibit excellent color characteristics with even a small amount in a cooling liquid composition. Therefore, the colorant of the present disclosure is especially suitable as a colorant for a cooling liquid composition and can exhibit excellent characteristics.

In addition, the colorant of the present disclosure has excellent electric insulation, so that when a cooling liquid composition containing the colorant of the present disclosure is used, the cooling liquid composition has very low electric conductivity and a very low possibility of being contaminated by an ion exchange resin of a fuel cell.

In accordance with another aspect of the present disclosure, there is provided a cooling liquid composition containing a colorant, a glycol compound, and water.

In the present disclosure, the colorant contained in the cooling liquid composition may be a colorant having a structure of Chemical Formula 1 below.

$R—[X\text{-}A\text{-}Z]_y$ [Chemical Formula 1]

In the present disclosure, R may be a chromophore.

In the present disclosure, the chromophore has at least one 5-member heterocyclic aromatic structure and binds to a benzene ring, and examples thereof may include porphyrin related tetrapyrrole compounds, phthalocyanine related tetrapyrrole compounds, or porpyrazine related tetrapyrrole compounds, but are not limited thereto.

In the present disclosure, X is a linker that links the chromophore and a water-soluble group and may be selected from the group consisting of C, O, N, and S. For example, the linker may be $—CH_2—$ having two hydrogen atoms when C is selected, —NH— having one hydrogen atom when N is selected, or —O— having no hydrogen atom when O is selected, but is not limited thereto.

In the present disclosure, A is a water-soluble group for giving water solubility to a colorant, and for example, the water-soluble group may be a $C_1$ to $C_4$ alkoxy group, but is not limited thereto.

In the present disclosure, Z may be an alkyl group containing —H or a $C_1$ to $C_4$ as an end substituent, but is not limited thereto.

In the present disclosure, y may be an integer of 4 to 16, for example, 4 or 8, but is not limited thereto.

In the present disclosure, [X-A-Z] may be a hydrophilic polymer, and examples thereof may include any one of polyethylene glycol (PEG), polyvinyl alcohol, polyvinylpyrrolidone, or two or more copolymers thereof, but is not limited thereto.

In the present disclosure, the polyethylene glycol may be at least one selected from the group consisting of mono ethylene glycol (MEG), di ethylene glycol (DEG), and tri ethylene glycol (TEG), but is not limited thereto.

In the present disclosure, the colorant may display a color of blue or bluish green, and the color change may appear depending on the type of peripheral substituents and the number of substituents.

In the present disclosure, the colorant for a heat transfer fluid may have a structure of Chemical Formula 2 or 3.

[Chemical Formula 2]

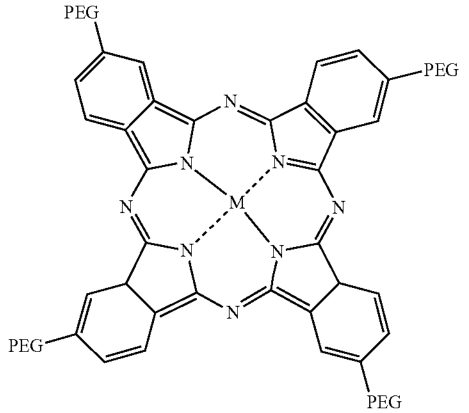

[Chemical Formula 3]

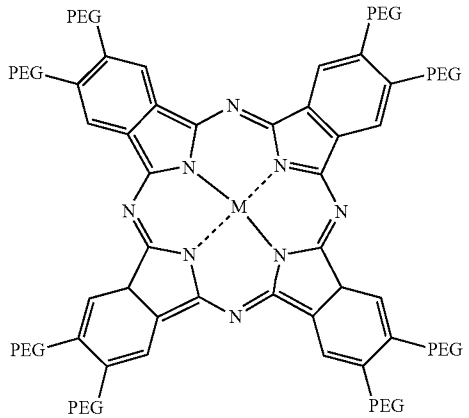

In the present disclosure, M may be a metal or a metalloid.

In the present disclosure, the metal or metalloid may be copper (Cu), zinc (Zn), silicon (Si), aluminum (Al), gallium (Ga), indium (In), titanium (Ti), tin (Sn), or ruthenium (Ru), for example, copper or zinc, but is not limited thereto.

Silicon is a metalloid element and is generally a non-metal, but silicon in the present disclosure refers to metallic silicon that has the same crystal structure as a metal crystal and exhibits properties close to those of a metal.

In the present disclosure, the content of the colorant having a structure of chemical formula 1 contained in the cooling liquid composition may be 0.001 to 10.000 wt %, 0.001 to 9.000 wt %, 0.001 to 8.000 wt %, 0.001 to 7.000 wt %, 0.001 to 6.000 wt %, 0.001 to 5.000 wt %, 0.001 to 4.000 wt %, 0.001 to 3.000 wt %, 0.001 to 2.000 wt %, 0.001 to 1.000 wt %, 0.001 to 0.100 wt %, or 0.001 to 0.010 wt %, for example, 0.002 to 0.008 wt %, relative to the total weight of the cooling liquid composition.

In the present disclosure, the glycol compound may employ any one that is known in the art, and may be at least one selected from the group consisting of ethylene glycol, diethylene glycol, triethylene glycol, propylene glycol, dipropylene glycol, butylene glycol, polyalkylene glycol, and glycol ether, and may be, for example, ethylene glycol, but is not limited thereto.

In the present disclosure, the glycol compound may be contained in 30 to 70 wt %, 30 to 65 wt %, 30 to 60 wt %, 30 to 55 wt %, 35 to 70 wt %, 35 to 65 wt %, 35 to 60 wt %, 35 to 55 wt %, 40 to 70 wt %, 40 to 65 wt %, 40 to 60 wt %, 40 to 55 wt %, 45 to 70 wt %, 45 to 65 wt %, 45 to 60 wt %, or 45 to 55 wt %, for example 45 to 54 wt %, relative to the total weight of the composition.

In the present disclosure, the water may be deionized water, pure distilled water, or double distilled water, but is not limited thereto.

In the present disclosure, the water may be contained in 30 to 70 wt %, 30 to 65 wt %, 30 to 60 wt %, 30 to 55 wt %, 35 to 70 wt %, 35 to 65 wt %, 35 to 60 wt %, 35 to 55 wt %, 40 to 70 wt %, 40 to 65 wt %, 40 to 60 wt %, 40 to 55 wt %, 45 to 70 wt %, 45 to 65 wt %, 45 to 60 wt %, or 45 to 55 wt %, and for example 45 to 54 wt %, relative to the total weight of the composition.

In the present disclosure, the cooling liquid composition may further contain a defoamer.

In the present disclosure, the defoamer may be contained in 0.001 to 0.100 wt %, 0.001 to 0.050 wt %, 0.001 to 0.010 wt %, 0.001 to 0.008 wt %, 0.002 to 0.100 wt %, 0.002 to 0.050 wt %, 0.002 to 0.010 wt %, 0.002 to 0.008 wt %, 0.003 to 0.100 wt %, 0.003 to 0.050 wt %, 0.003 to 0.010 wt %, 0.003 to 0.008 wt %, 0.004 to 0.100 wt %, 0.004 to 0.050 wt %, 0.004 to 0.010 wt %, 0.004 to 0.008 wt %, 0.005 to 0.100 wt %, 0.005 to 0.050 wt %, or 0.005 to 0.010 wt %, and for example, 0.005 to 0.008 wt %, relative to the total weight of the composition.

In the present disclosure, the cooling liquid composition may further contain a pH adjuster.

In the present disclosure, the pH adjuster may be contained in 0.0005 to 0.1 wt %, 0.0005 to 0.01 wt %, 0.0005 to 0.009 wt %, 0.0005 to 0.008 wt %, 0.0005 to 0.007 wt %, or 0.0005 to 0.006 wt %, for example, 0.0005 to 0.005 wt %, relative to the total weight of the composition.

In the present disclosure, the pH adjuster may be an amine-based compound.

In the present disclosure, the amine-based compound may be at least one selected from the group consisting of alkanol amines, alkyl amines, and cyclic amines.

In the present disclosure, the alkanol amines may be monomethanolamine, dimethanolamine, trimethanolamine, monoethanolamine, diethanolamine, triethanolamine, monopropanolamine, dipropanolamine, tripropanolamine, monoisopropanolamine, and diisopropanolamine, triisopropanolamine, but are not limited thereto.

In the present disclosure, the alkyl amines may be dibutylamine, tributylamine, dicyclohexylamine, cyclohexyl amine and its salts, piperazine, n-propylamine, isopropylamine, n-butylamine, isobutylamine, sec-butylamine, tert-butylamine, n-pentylamine, n-hexylamine, n-heptylamine, n-octylamine, 2-ethylhexylamine, n-nonylamine, n-decylamine, 2-propylheptylamine, n-undecylamine, n-dodecylamine, n-tridecylamine, isotridecylamine, n-tetradecylamine, n-pentadecylamine, n-hexadecylamine, n-heptadecylamine, n-octadecylamine, n-nonadecylamine, n-eicosyl-amine, di-(n-hexyl)amine, di-(n-heptyl)amine, di-(n-octyl)amine, di-(2-ethylhexyl)amine, di-(n-nonyl)amine, di-(n-decyl)amine, di-(2-propylheptyl)amine, di-(n-undecyl)amine, di-(n-dodecyl)amine, di-(n-tridecyl)amine, di-(isotridecyl)amine, di-(n-tetradecyl)amine, di-(n-pentadecyl)amine, di-(n-hexadecyl)amine, di-(n-heptadecyl) amine, di-(n-octadecyl)-amine, di-(n-nonadecyl)amine, di-(n-eicosyl)amine, n-hexylmethylamine, n-heptylmethylamine, n-octylmethylamine, (2-ethylhexyl) methylamine, n-nonylmethylamine, n-decylmethylamine, (2-propylheptyl)methylamine, n-undecylmethylamine, n-dodecyl-methylamine, n-tridecylmethylamine, isotridecylmethylamine, n-tetradecylmethylamine, n-pentadecylmethylamine, n-hexadecylmethylamine, n-heptadecylmethylamine, n-octa-decylmethylamine, n-nonadecylmethylamine, n-eicosylmethylamine, di-(n-nonyl)amine, di-(n-decyl)amine, di-(2-propylheptyl)amine, di-(n-undecyl)amine, di-(n-dodecyl)amine, di-(n-tridecyl) amine, di-(isotridecyl)amine, di-(n-tetradecyl)amine, di-(n-pentadecyl)amine, di-(n-hexadecyl)amine, di-(n-heptadecyl)amine, di-(n-octadecyl)-amine, di-(n-nonadecyl) amine, di-(n-eicosyl)amine, n-hexylmethylamine, n-heptylmethylamine, n-octylmethylamine, (2-ethylhexyl) methylamine, n-nonylmethylamine, n-decylmethylamine, (2-propylheptyl)methylamine, n-undecylmethylamine, n-dodecyl-methylamine, n-tridecylmethylamine, isotridecylmethylamine, n-tetradecylmethylamine, n-pentadecylmethylamine, n-hexadecylmethylamine, n-heptadecylmethylamine, n-octa-decylmethylamine, n-nonadecylmethylamine, and n-eicosylmethylamine, but are not limited thereto.

In the present disclosure, the cyclic amine may be morpholine, but is not limited thereto.

In an embodiment of the present disclosure, the amine-based compound may be triethanolamine.

In another embodiment of the present disclosure, the trimethanolamine may be contained in 0.0005 to 0.1 wt %, 0.0005 to 0.01 wt %, 0.0005 to 0.009 wt %, 0.0005 to 0.008 wt %, 0.0005 to 0.007 wt %, or 0.0005 to 0.006 wt %, and for example, 0.0005 to 0.005 wt %, relative to the total weight of the composition.

In the present disclosure, the cooling liquid composition may further contain a metal corrosion inhibitor.

In the present disclosure, the metal corrosion inhibitor may be contained in 0.0001 to 11.0 wt %, 0.0001 to 10.0 wt %, 0.0001 to 9.0 wt %, 0.0001 to 8.0 wt %, 0.0001 to 7.0 wt %, 0.0001 to 6.0 wt %, 0.0001 to 5.0 wt %, 0.0001 to 4.0 wt %, 0.0001 to 3.0 wt %, or 0.0001 to 2.0 wt %, and for example 0.0001 to 1.0 wt %, relative to the total weight of the composition.

In the present disclosure, the metal corrosion inhibitor may be an azole-based metal corrosion inhibitor, for example, a triazole-based metal corrosion inhibitor or a thiadiazole-based metal corrosion inhibitor, but is not limited thereto.

In the present disclosure, the triazole-based metal corrosion inhibitor may be selected from the group consisting of triazole derivatives, benzotriazole derivatives, and tolutriazole derivatives, but is not limited thereto.

In the present disclosure, examples of the triazole-based metal corrosion inhibitor may be N,N-bis(2-ethylhexyl)-4-methyl-1H-benzotriazole-1-methylamine, N,N-bis(2-ethylhexyl)-5-methyl-1H-benzotriazole-1-methylamine, octyl 1H benzotriazole, ditertiary butylated 1H benzotriazole, 1H-1,2,3-triazole, 2H-1,2,3-triazole, 1H-1,2,4-triazole, 4H-1,2,4-triazole, 1-(1',2'-di-carboxyethyl)benzotriazole, 2-(2'-hydroxy-5'-methyl phenyl)benzotriazole, 1H-1,2,3-triazole, 2H-1,2,3-triazole, 1H-1,2,4-triazole, 4H-1,2,4-triazole, benzotriazole, tolyltriazole, carboxybenzotriazole, 3-amino-1,2,4-triazole, chlorobenzotriazole, nitrobenzotriazole, aminobenzotriazole, cyclohexane [1,2-d] triazole, 4,5,6,7-tetrahydroxytolyltriazole, 1-hydroxybenzotriazole, ethyl benzotriazole, naphthotriazole, 1-[N,N-bis(2-ethylhexyl) aminomethyl]benzotriazole, 1-[N,N-bis(2-ethylhexyl)aminomethyl]tolyltriazole, 1-[N,N-bis(2-ethylhexyl)aminomethyl]carboxybenzotriazole, 1-[N,N-bis(di-(ethanol)-aminomethyl]benzotriazole, 1-[N,N-bis(di-(ethanol)-aminomethyl]tolyltriazole, 1-[N,N-bis(di-(ethanol)-aminomethyl]carboxybenzotriazole, 1-[N,N-bis(2-hydroxypropyl)aminomethyl]carboxybenzotriazole, 1-[N,N-bis(1-butyl)aminomethyl]carboxybenzotriazole, 1-[N,N-bis(1-octyl)aminomethyl]carboxybenzotriazole, 1-(2',3'-di-hydroxy propyl)benzotriazole, 1-(2',3'-di-carboxyethyl)benzotriazole, 2-(2'-hydroxy-3',5'-di-tert-butylphenyl) benzotriazole, 2-(2'-Hydroxy-3',5'-di-tert-amylphenyl)benzotriazole, 2-(2'-hydroxy-4'-octoxyphenyl)benzotriazole, 2-(2'-hydroxyl-5'-tert-butyl phenyl)benzotriazole, 1-hydroxybenzotriazole-6-carboxylic acid, 1,2,4-triazol-3-ol, 3-amino-5-phenyl-1,2,4-triazole, 3-amino-5-heptyl-1,2,4-triazole, 3-amino-5-(4-isopropyl-phenyl)-1,2,4-triazole, 5-amino-3-mercapto-1,2,4-triazole, 3-amino-5-(p.tert-butylphenyl)-1,2,4-triazole, 5-amino-1,2,4-triazole-3-carboxylic acid, 1,2,4-triazole-3-carboxamide, 4-aminourazole, 1,2,4-triazol-5-one, and the like, but are not limited thereto.

In the present disclosure, examples of the thiadiazole-based metal corrosion inhibitor may be 2,5-dimercapto-1,3,4-thiadiazole, thiadiazole, 2-mercapto-5-hydrocarbylthio-1,3,5-thiadiazole, 2-mercapto-5-hydrocarbyldithio-1,3,4-thiadiazole, 2,5-bis(hydrocarbylthio)-1,3,4-thiadiazole, 2,5-bis(hydrocarbyldithio)-1,3,4-thiadiazole, and the like, but are not limited thereto.

In the present disclosure, the cooling liquid composition may be a cooling liquid composition for an internal combustion engine, a cooling liquid composition for an electric battery, or a cooling liquid composition for a fuel cell, for example, a cooling liquid composition for a fuel cell.

In the present disclosure, the electrical conductivity of the cooling liquid composition may be 50.0 uS/cm or less, for example, less than 50.0 uS/cm. An electrical conductivity higher than the reference value may degrade the performance of a fuel cell stack and cause a risk of failure.

Advantageous Effects of Invention

The present disclosure is directed to a colorant for a heat transfer fluid and a composition containing the same, wherein the colorant has excellent color intensity, physical and chemical stability, and superb solubility in a glycol-based cooling liquid composition, especially an ethylene glycol-based cooling liquid composition. Accordingly, the cooling liquid composition of the present disclosure exhibits excellent characteristics when used as a cooling liquid for a fuel cell, due to excellent color intensity, physical and chemical stability, and low electrical conductivity.

BEST MODE FOR CARRYING OUT THE INVENTION

Figure 1:
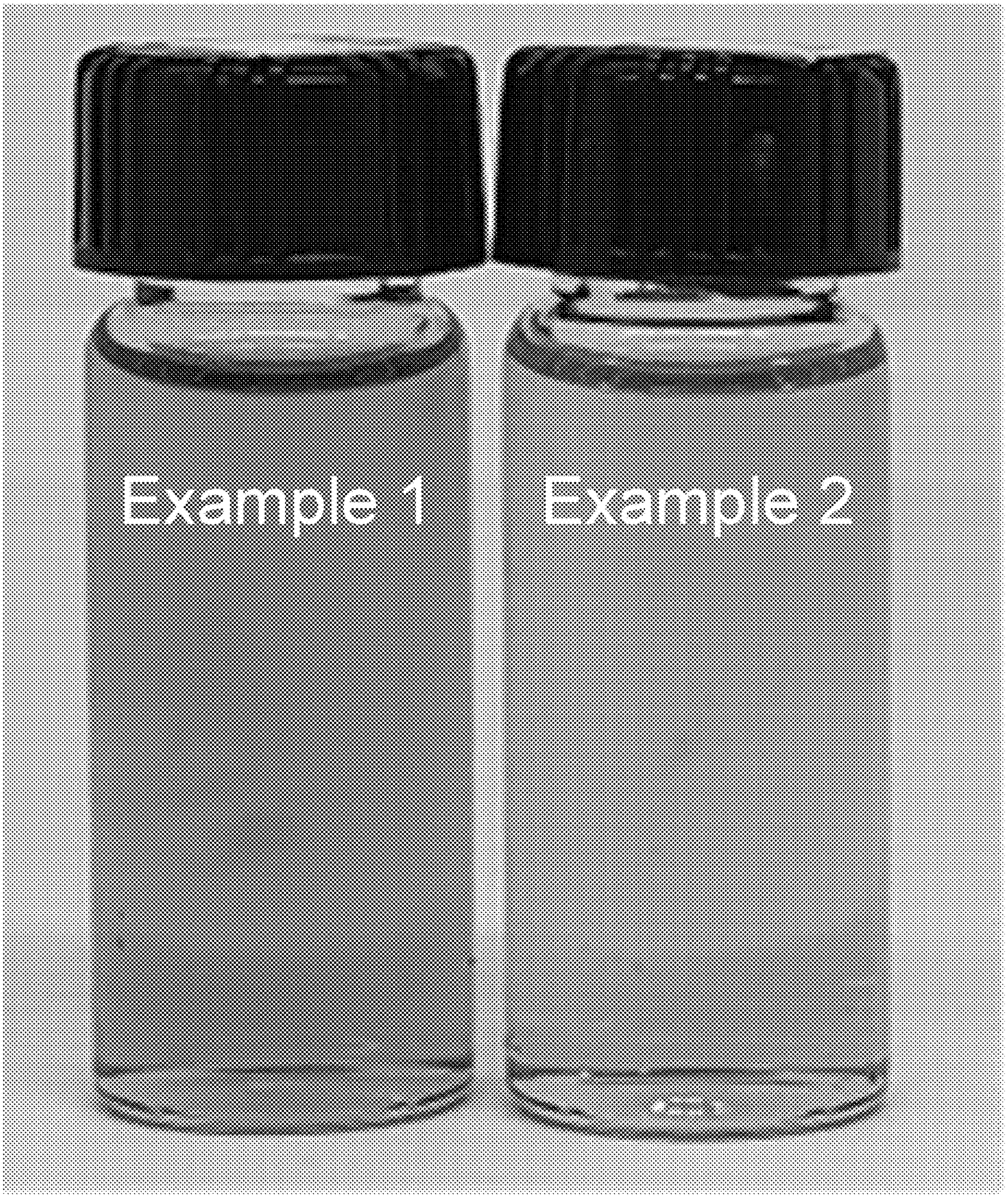
FIG. 1 is a picture showing colors of colorant compounds prepared according to examples of the present disclosure.

An antifreeze composition containing: 0.001 to 10.000 wt % of a colorant having a structure of Chemical Formula 1 or 2; 30 to 70 wt % of a glycol compound; and 30 to 70 wt % of water.

DETAILED DESCRIPTION

Hereinafter, the present disclosure will be described in more detail by the following examples. However, these examples are used only for illustration, and the scope of the present disclosure is not limited by these examples.

Preparation Example 1: Preparation of Example 1

PEG 400, 4-nitro phthalonitrile, and $CsCO_3$ were added and reacted at 70° C. for 12 hours, and THF was used as a solvent. After the reaction, THF and $CsCO_3$ were removed, and then the reaction product was washed to obtain PEG-PN, a primary reaction product. The synthesized PEG-PN was used to synthesize a colorant. Specifically, PEG-PN, $CuCl_2$, and DBU were reacted at 160° C. for 8 hours. Thereafter, solvent removal, washing, and recrystallization were performed, and then a bluish green colorant was ultimately obtained.

[Chemical Formula 2]

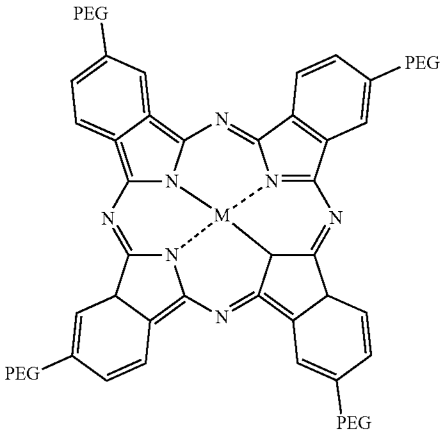

Preparative Example 2: Preparation of Example 2

TEG, di-fluorophthalonitrile, and $K_2CO_3$ were added and reacted at 70° C. for 12 hours, and THF was used as a solvent. After the reaction, THF and $K_2CO_3$ were removed, and then the reaction product was washed to obtain Di-PEG-PN, a primary reaction product. The synthesized Di-PEG-PN was used to synthesize a colorant. Specifically, Di-PEG-PN, $Zn(OAc)_2$, and DBU were reacted at 160° C. for 8 hours. Thereafter, solvent removal, washing, and recrystallization were performed, and then a bluish green colorant was ultimately obtained.

[Chemical Formula 3]

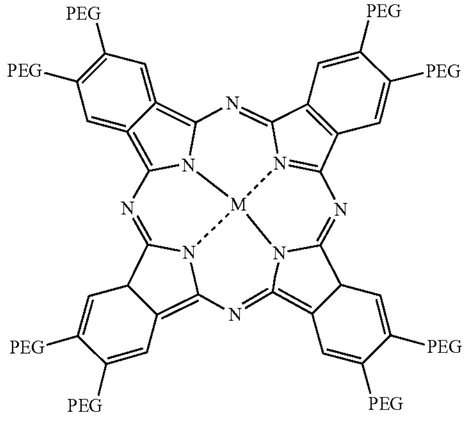

Test Example 1: Evaluation of Physiochemical Stability

Thermogravimetric analysis was measured using a TA Q600 instrument while the temperature was raised to 300° C. at a temperature rise rate of 10° C. per minute in a nitrogen atmosphere. As for the acid/alkali stability test, the decomposition of the compounds in a solution of pH 2 to 12 was investigated through visual observation and the absorbance area change and the absorbance intensity were measured through UV-Vis measurement.

The results of stability are shown in Table 1 below by marking ◎ when the weight change rate was 10% or less at 250° C. or higher as a result of thermogravimetric analysis and the acid/alkali stability was excellent; marking ○ when the weight change rate was approximately 20% at 250° C. or higher as a result of thermogravimetric analysis and the acid/alkali stability was excellent; marking Δ when the weight change rate was approximately 30% at 250° C. or higher as a result of thermogravimetric analysis and the acid/alkali stability was excellent; and marking X in all other cases.

TABLE 1

| Sample | Physiochemical stability |
|---|---|
| Example 1 | ◎ |
| Example 2 | ◎ |

As can be identified in Table 1, the thermogravimetric analysis results of Examples 1 and 2 could identify that both examples 1 and 2 showed superior thermal stability at a temperature of 250° C. Especially, both Examples 1 and 2 were thermally stable at up to about 300° C., and decomposed at higher temperatures. Examples 1 and 2 were excellent in terms of acid and alkali stability. In other words, Examples 1 and 2 were identified to be thermally and chemically very stable.

Experimental Example 2: Evaluation of Solubility Properties

As for solubility properties, the solubility was visually observed and measured by preparing 1 L of a cooling liquid at room temperature, adding 0.1 g of a compound, and further adding 0.4 g if the compound was completely dissolved, checking whether the compound was completely dissolved, and then adding 0.5 g. The results are shown in Table 2 by marking ◎ when the solubility in a commercial cooling liquid composition containing ethylene glycol as a main ingredient was 1.0 g/L or more, ○ when 0.5 g/L or more, Δ when 0.1 g/L or more, and X when less than the last value.

TABLE 2

| Sample | Solubility properties |
|---|---|
| Example 1 | ◎ |
| Example 2 | ◎ |

As can be identified in Table 2, Examples 1 and 2 showed superb solubility properties of 1.5 g/L and 3.0 g/L, respectively, in the cooling liquid composition containing ethylene glycol as a main ingredient. That is, Examples 1 and 2 were identified to be well dissolved in a cooling liquid at a higher level compared with other dyes that are usually used, and it can be therefore identified that the colorants of the present disclosure can display colors stably and uniformly in a cooling liquid composition due to excellent solubility properties in the cooling liquid composition.

Experimental Example 3: Evaluation of Electrical Conductivity

Conductivity was measured for a cooling liquid composition containing 0.01 wt % of a colorant by using a TCX-90$^{3}$ instrument, and the results are shown in Table 3.

TABLE 3

| Sample | Electrical conductivity (uS/cm) |
|---|---|
| Example 1 | 0.944 |
| Example 2 | 0.951 |

As can be identified in Table 3, both the cooling liquid compositions containing Examples 1 and 2 showed electrical conductivity of 1.0 uS/cm or less, indicating vary low electrical conductivity. That is, it was identified that the cooling liquid compositions containing the colorants of the present disclosure showed excellent electric insulation.

Experimental Example 4: Evaluation of Ion Exchange Resin Passage

An ion exchange resin is used to remove ions eluted from fuel cell cooling system components (stacks, radiators, rubber, etc.) and to maintain electrical conductivity at a constant level. When a cooling liquid passes through the ion exchange resin, a general colorant is decolorized and thus the discriminability of the cooling liquid is lost. Therefore, a developed colorant was applied to a cooling liquid to check whether the cooling liquid was discolored by passing through an ion exchange resin.

Figure 2:
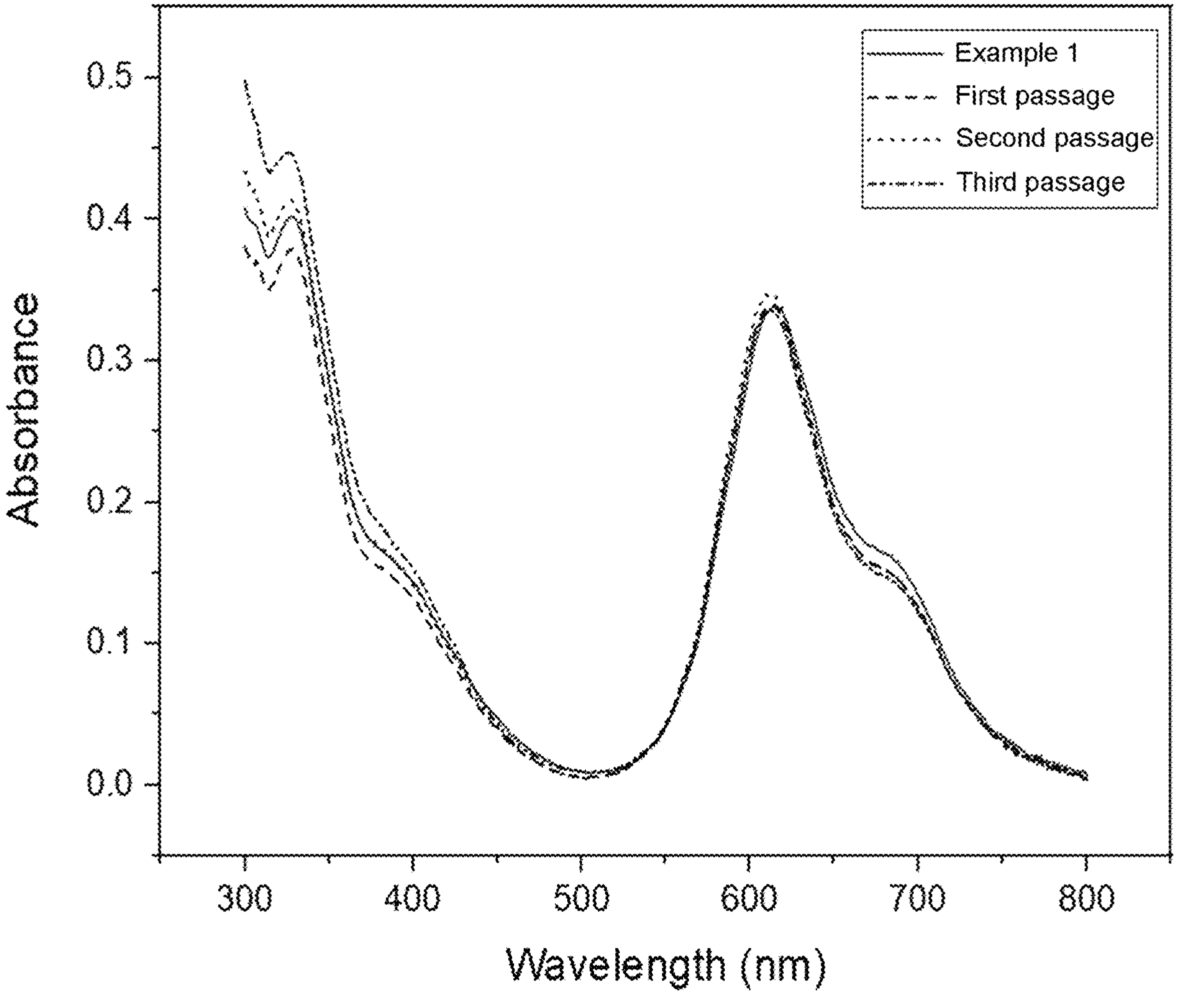
FIG. 2 is a graph showing ion exchange resin passage evaluation results of the colorant compound (Example 1) prepared according to the example of the present disclosure.
Figure 3:
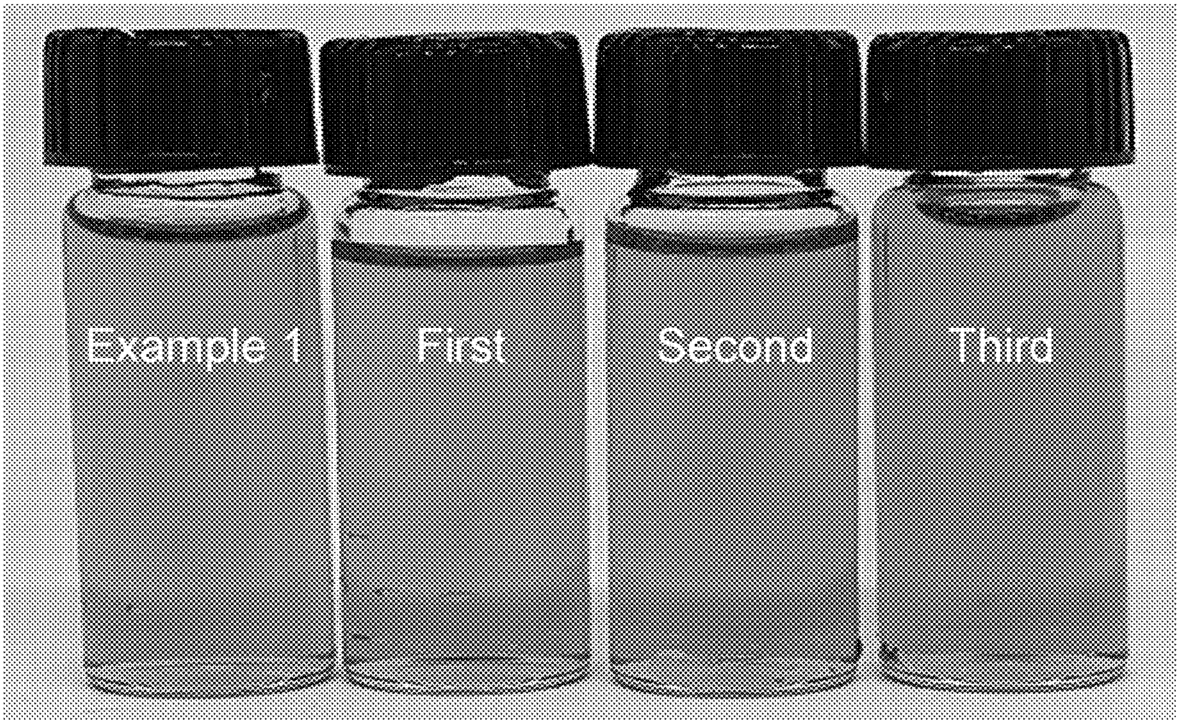
FIG. 3 is a picture showing ion exchange resin passage evaluation results of a colorant compound (Example 1) prepared according to an example of the present disclosure.
Figure 4:
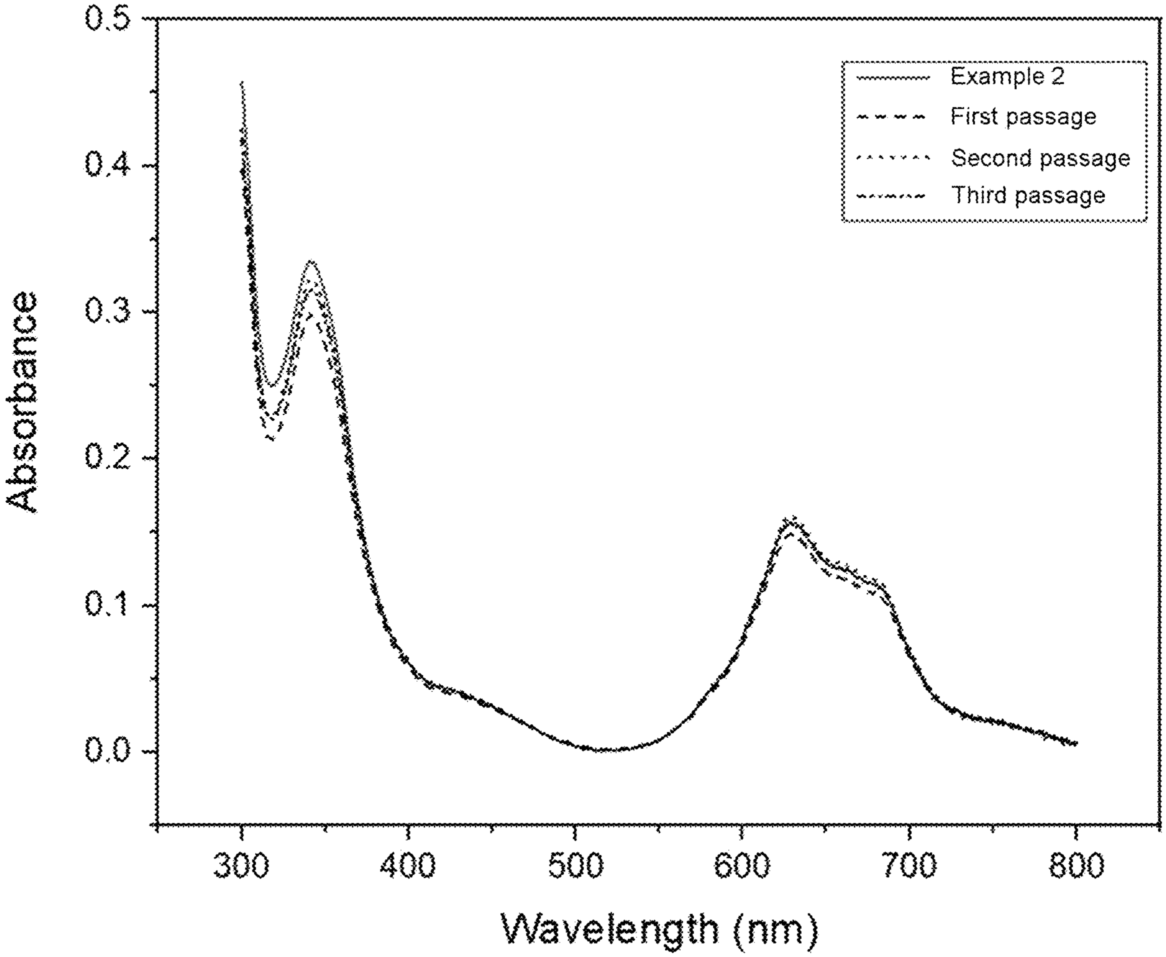
FIG. 4 is a graph showing ion exchange resin passage evaluation results of a colorant compound (Example 2) prepared according to the example of the present disclosure.
Figure 5:
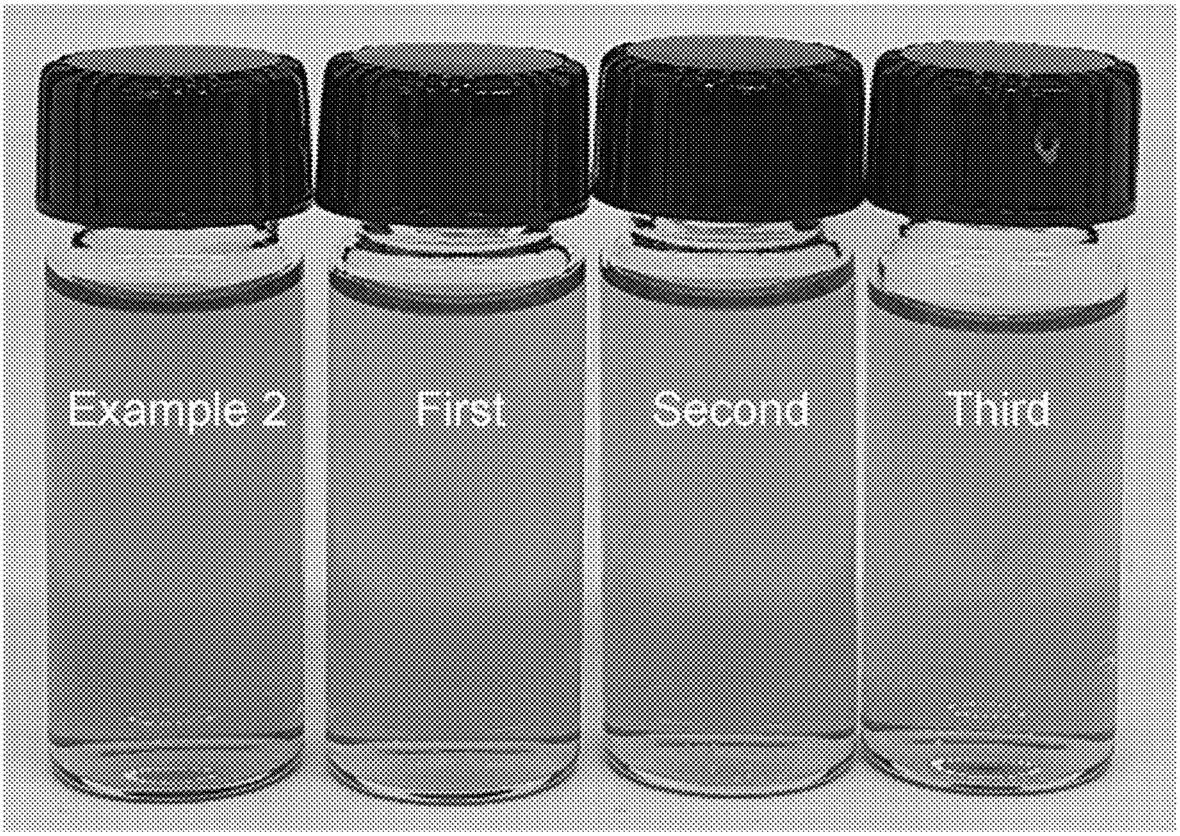
FIG. 5 is a picture showing ion exchange resin passage evaluation results of a colorant compound (Example 2) prepared according to an example of the present disclosure.

For evaluation, 3 wt % or more of an ion exchange resin was added to a cooling liquid employing a developed colorant and stirred for 30 minutes or more to check a color, and then the ion exchange resin was replaced 3 times. The color development was visually checked and the absorbance intensity values of the solution before and after passage were compared, and the results are shown in Table 4 and FIGS. 2 to 5.

TABLE 4

| Sample | First replacement of ion exchange resin | Second replacement of ion exchange resin | Third replacement of ion exchange resin |
|---|---|---|---|
| Example 1 | No discoloration (bluish green) | No discoloration (bluish green) | No discoloration (bluish green) |
| Example 2 | No discoloration (bluish green) | No discoloration (bluish green) | No discoloration (bluish green) |

As can be identified in Table 4 and FIGS. 2 to 5, Examples 1 and 2 did not contaminate ion exchange resins.

INDUSTRIAL APPLICABILITY

The present disclosure relates to a colorant for a heat transfer fluid and a composition containing the same.

What is claimed is:

1. A cooling liquid composition for a fuel cell, comprising:

0.001 to 1.000 wt % of a colorant having a structure of Chemical Formula 2 or 3;

[Chemical Formula 2]

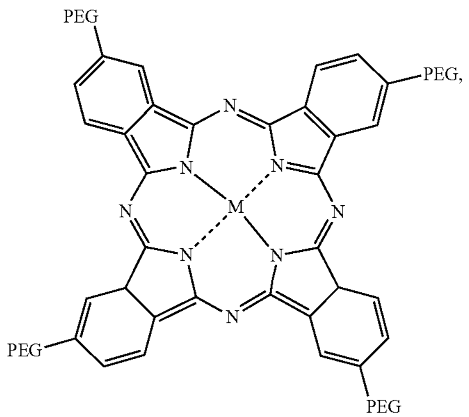

or

[Chemical Formula 3]

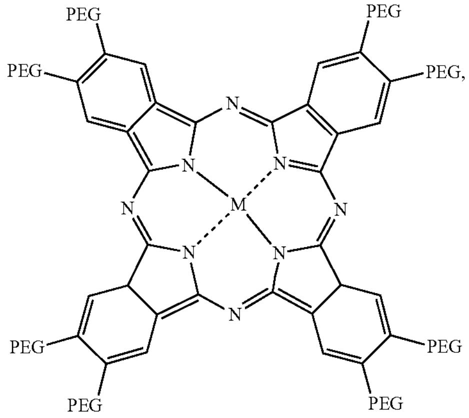

wherein in Chemical Formula 2, M is copper (Cu), wherein in Chemical Formula 3, M is zinc (Zn), and 30 to 65 wt % of a glycol compound;

30 to 65 wt % of water; and 0.0001 to 2.0 wt % of a metal corrosion inhibitor, wherein the colorant has a solubility of 1.5 g/L or more with respect to the cooling liquid composition in the cooling liquid composition comprising the glycol compound and water, and has a weight loss rate of 10% or less at a temperature of 250° C.

2. The cooling liquid composition of claim 1, further comprising 0.001 to 0.100 wt % of a defoamer relative to the total weight thereof.

3. The cooling liquid composition of claim 1, further comprising 0.0005 to 0.1 wt % of a pH adjuster relative to the total weight thereof.

4. The cooling liquid composition of claim 3, wherein the pH adjuster is an amine-based compound.

5. The cooling liquid composition of claim 4, wherein the amine-based compound is at least one selected from the group consisting of alkanol amines, alkyl amines, and cyclic amines.

6. The cooling liquid composition of claim 4, wherein the amine-based compound is triethanolamine.

7. The cooling liquid composition of claim 1, wherein the metal corrosion inhibitor is an azole.

8. The cooling liquid composition of claim 1, wherein the cooling liquid composition has an electrical conductivity of 50.0 uS/cm or less.

* * * * *